(12) United States Patent
Chae et al.

(10) Patent No.: US 7,236,744 B2
(45) Date of Patent: Jun. 26, 2007

(54) APPARATUS AND METHOD FOR RECEIVING SIGNALS IN A MOBILE COMMUNICATION SYSTEM USING ADAPTIVE ANTENNA ARRAY TECHNOLOGY

(75) Inventors: Chan-Byoung Chae, Seoul (KR); Pan-Yuh Joo, Yongin-si (KR); Seok-Hyun Yoon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 407 days.

(21) Appl. No.: 10/914,461

(22) Filed: Aug. 9, 2004

(65) Prior Publication Data

US 2005/0032476 A1 Feb. 10, 2005

(30) Foreign Application Priority Data

Aug. 7, 2003 (KR) ............ 10-2003-0054684

(51) Int. Cl.
*H04B 15/00* (2006.01)
(52) U.S. Cl. ............ 455/65; 455/561; 455/63.4; 455/278; 455/25
(58) Field of Classification Search .......... 455/63.4, 455/25, 561, 65, 278
See application file for complete search history.

(56) References Cited

U.S. PATENT DOCUMENTS

| | | | | |
|---|---|---|---|---|
| 5,887,038 A * | 3/1999 | Golden | .................. | 375/347 |
| 6,353,643 B1 * | 3/2002 | Park | .................. | 375/347 |
| 6,714,584 B1 * | 3/2004 | Ishii et al. | .................. | 375/148 |
| 6,959,169 B2 * | 10/2005 | Miyoshi | .................. | 455/63.1 |
| 7,116,702 B2 * | 10/2006 | Sim | .................. | 375/148 |
| 2002/0028694 A1 * | 3/2002 | Doi | .................. | 455/550 |
| 2002/0044616 A1 * | 4/2002 | Sim | .................. | 375/347 |
| 2002/0054621 A1 * | 5/2002 | Kyeong et al. | ......... | 375/147 |
| 2003/0128656 A1 * | 7/2003 | Scarpa | .................. | 370/203 |
| 2004/0185783 A1 * | 9/2004 | Okawa et al. | ......... | 455/63.4 |
| 2004/0228420 A1 * | 11/2004 | Chul | .................. | 375/267 |
| 2004/0235421 A1 * | 11/2004 | Matsuoka et al. | ...... | 455/63.4 |

OTHER PUBLICATIONS

Kwak et al., "Blind Adaptive Space-Time Receiving and Transmitting Diversities for Multiuser DS-CDMA Systems", 1999 IEEE, pp. 924-928.

Ohgane et al., "BER Performance of CMA Adaptive Array For High-Speed GMSK Mobile Communication—A Description of Measurements in Central Tokyo", IEEE Transactions on Vehicular Technology, 42, Nov. 1993, No. 4, pp. 484-490.

\* cited by examiner

*Primary Examiner*—Lana N. Le
*Assistant Examiner*—Amar Daglawi
(74) *Attorney, Agent, or Firm*—The Farrell Law Firm

(57) ABSTRACT

A base station having at least one reception antenna generates a reception beam using a previous reception beam weight and a despread signal of a current reception signal, calculates an error value indicating a difference between the current reception signal and a desired reception signal, and calculates a current reception beam weight using the previous reception beam weight, the despread signal and the error value. The base station generates a reception beam weight step value using the error value and an output signal, calculates a difference between the previous reception beam weight and a product of the reception beam weight step value, the despread signal, and a conjugate value of the error value, as the current reception beam weight, and selects the reception beam weight step value such that the current reception beam weight becomes the optimal reception beam.

23 Claims, 8 Drawing Sheets

APPARATUS AND METHOD FOR RECEIVING SIGNALS IN A MOBILE COMMUNICATION SYSTEM USING ADAPTIVE ANTENNA ARRAY TECHNOLOGY

This application claims priority under 35 U.S.C. § 119 to an application entitled "Apparatus and Method for Receiving Signals in a Mobile Communication System Using Adaptive Antenna Array Technology" filed in the Korean Intellectual Property Office on Aug. 7, 2003 and assigned Serial No. 2003-54684, the contents of which are incorporated herein by reference.

BACKGROUND OF THE INVENTION

1. Field of the Invention

The present invention relates generally to an apparatus and method for receiving data in a mobile communication system using Adaptive Antenna Array (AAA) technology, and in particular, to an apparatus and method for receiving data using a reception beam weight generation scheme having an adaptive reception beam weight step.

2. Description of the Related Art

A next generation mobile communication system has evolved into a packet service communication system that transmits burst packet data to a plurality of mobile stations (MSs). The packet service communication system has been designed to transmit mass data. Such a packet service communication system has been developing for high-speed packet service. In this regard, the $3^{rd}$ Generation Partnership Project (3GPP), a standardization organization for asynchronous communication technology, proposes High Speed Downlink Packet Access (HSDPA) to provide the high-speed packet service, while $3^{rd}$ Generation Partnership Project 2 (3GPP2), a standardization organization for synchronous communication technology, proposes 1× Evolution Data Only/Voice (1× EV-DO/V) to provide the high-speed packet service. Both HSDPA and 1× EV-DO/V intend to provide high-speed packet service for smooth transmission of Web/Internet service. In order to provide the high-speed packet service, a peak throughput and an average throughput should be optimized for smooth transmission of packet data and circuit data, such as voice service data.

In order to support high-speed transmission of packet data, a communication system employing HSDPA (hereinafter referred to as an "HSDPA communication system") has newly introduced 3 types of data transmission techniques: Adaptive Modulation and Coding (AMC), Hybrid Automatic Retransmission Request (HARQ), and Fast Cell Selection (FCS). The HSDPA communication system increases a data rate using the AMC, HARQ, and FCS techniques.

Another communication system that increases a data rate, is a communication system using 1× EV-DO/V (hereinafter referred to as a "1× EV-DO/V communication system"). The 1× EV-DO/V communication system also increases a data rate to secure system performance. Aside from the new techniques such as AMC, HARQ, and FCS, a Multiple Antenna technique is another technique for operating within the limited assigned bandwidth, i.e., increasing a data rate. The Multiple Antenna technique overcomes the limitation of bandwidth resource in a frequency domain by utilizing a space domain.

A communication system is constructed such that a plurality of mobile stations communicate with each other via a base station (BS). When the base station performs high-speed data transmission to the mobile stations, a fading phenomenon occurs due to a characteristic of radio channels. In order to overcome the fading phenomenon, a Transmit Antenna Diversity technique, which is a type of the Multiple Antenna technique, has been proposed. The "Transmit Antenna Diversity" refers to a technique for transmitting signals using at least two transmission antennas, i.e., multiple antennas, to minimize a loss of transmission data due to a fading phenomenon, thereby increasing a data rate.

Generally, in a wireless channel environment in a mobile communication system, unlike in a wired channel environment, a transmission signal is distorted by a number of factors, such as multipath interference, shadowing, wave attenuation, time-varying noise, interference, etc. Fading caused by the multipath interference is closely related to the mobility of a reflector or a user (or a mobile station), and actually, a mixture of a transmission signal and an interference signal is received. Therefore, the received signal suffers from severe distortion during its actual transmission, thereby reducing performance of the entire mobile communication system.

The fading may result in distortion in amplitude and phase of the received signal, preventing high-speed data communication in the wireless channel environment. A substantial amount of research is being conducted in order to resolve the fading. Therefore, in order to transmit data at high speed, the mobile communication system must minimize a loss due to a characteristic of a mobile communication channel such as fading, and interference of an individual user. A diversity technique is used for preventing unstable communication due to the fading, and multiple antennas are used to implement a Space Diversity technique, which is a type of the diversity technique.

The Transmit Antenna Diversity is commonly used as a technique for efficiently resolving the fading phenomenon. The Transmit Antenna Diversity receives a plurality of transmission signals that have experienced independent fading phenomena in a wireless channel environment, thereby handling the distortion caused by the fading. The Transmit Antenna Diversity is classified into Time Diversity, Frequency Diversity, Multipath Diversity, and Space Diversity.

In order to perform high-speed data communication, a mobile communication system must be able to handle the fading phenomenon that severely affects communication performance. The fading phenomenon must be overcome because it may severely reduce an amplitude of a received signal.

In order to overcome the fading phenomenon, the above-described diversity techniques are used. For example, Code Division Multiple Access (CDMA) technology utilizes a Rake receiver that can achieve diversity performance using delay spread of the channel. The Rake receiver is a kind of a Receive Diversity technique for receiving multipath signals. However, the Receive Diversity used in the Rake receiver is disadvantageous in that it cannot achieve a desired diversity gain when delay spread of the channel is relatively small.

The Time Diversity technique efficiently copes with burst errors occurring in a wireless channel environment using interleaving and coding, and is generally used in a Doppler spread channel. Disadvantageously, however, the Time Diversity can hardly obtain the diversity effects in a low-speed Doppler spread channel.

The Space Diversity technique is generally used in a channel with a low delay spread such as an indoor channel and a pedestrian channel, which is a low-speed Doppler spread channel. The Space Diversity is a technique achieves a diversity gain using at least two antennas. In this technique, when a signal transmitted via one antenna is attenuated due to fading, a signal transmitted via another antenna is received, thereby acquiring a diversity gain. The Space Diversity is classified into Receive Antenna Diversity using a plurality of reception antennas and Transmit Antenna Diversity using a plurality of transmission antennas.

Receive-Adaptive Antenna Array (Rx-AAA), a kind of the Receive Antenna Diversity. In the Rx-AAA technique, by calculating a scalar product between a signal vector and an appropriate reception beam weight vector of a reception signal received via an antenna array comprised of a plurality of reception antennas, a signal received in a direction desired by a receiver is maximized in its level and a signal received in a direction not desired by the receiver is minimized in its level. The "reception beam weight" refers to a weight with which the receiver generates a reception beam in the Rx-AAA technique. As a result, the Rx-AAA technique amplifies only a desired reception signal to a maximum level, thereby maintaining a high-quality call and increasing the entire system capacity and service coverage.

Although the Rx-AAA can be applied to both a Frequency Division Multiple Access (FDMA) mobile communication system and a Time Division Multiple Access (TDMA) mobile communication system, it will be assumed herein that the Rx-AAA is applied to a communication system using CDMA (hereinafter referred to as a "CDMA communication system").

FIG. 1 is a block diagram illustrating a structure of a base station receiver in a conventional CDMA mobile communication system. Referring to FIG. 1, the base station receiver includes N reception antennas (Rx_ANT), i.e., a first reception antenna 111, a second reception antenna 121, . . . , and an $N^{th}$ reception antenna 131, N radio frequency (RF) processors, i.e., a first RF processor 112, a second RF processor 122, . . . , and an $N^{th}$ RF processor 132, being mapped to the corresponding reception antennas, N multipath searchers, i.e., a first multipath searcher 113, a second multipath searcher 123, . . . , and an $N^{th}$ multipath searcher 133, being mapped to the corresponding RF processors, L fingers, i.e., a first finger 140-1, a second finger 140-2, . . . , and an $L^{th}$ finger 140-L, for processing L multipath signals searched by the multipath searchers, a multipath combiner 150 for combining multipath signals output from the L fingers, a deinterleaver 160, and a decoder 170.

Signals transmitted by transmitters in a plurality of MSs are received at the N reception antennas over a multipath fading radio channel. The first reception antenna 111 outputs the received signal to the first RF processor 112. Each of the RF processors includes an amplifier, a frequency converter, a filter, and an analog-to-digital (A/D) converter, and is used to process an RF signal. The first RF processor 112 RF-processes a signal output from the first reception antenna 111 in order to convert the signal into a baseband digital signal, and outputs the baseband digital signal to the first multipath searcher 113. The first multipath searcher 113 separates L multipath components from a signal output from the first RF processor 112, and the separated L multipath components are output to the first finger 140-1 to the $L^{th}$ finger 140-L, respectively. The first finger 140-1 to the $L^{th}$ finger 140-L, being mapped to the L multiple paths on a one-to-one basis, process the L multipath components. Because the L multiple paths are considered for each of the signals received via the N reception antennas, signal processing must be performed on N×L signals. Among the N×L signals, signals on the same path are output to the same finger.

Similarly, the second reception antenna 121 outputs the received signal to the second RF processor 122. The second RF processor 122 RF-processes a signal output from the second reception antenna 121 to convert the signal into a baseband digital signal, and outputs the baseband digital signal to the second multipath searcher 123. The second multipath searcher 123 separates L multipath components from a signal output from the second RF processor 122, and the separated L multipath components are output to the first finger 140-1 to the $L^{th}$ finger 140-L, respectively.

In the same manner, the $N^{th}$ reception antenna 131 outputs the received signal to the $N^{th}$ RF processor 132. The $N^{th}$ RF processor 132 RF-processes a signal output from the $N^{th}$ reception antenna 131 to convert the signal into a baseband digital signal, and outputs the baseband digital signal to the $N^{th}$ multipath searcher 133. The $N^{th}$ multipath searcher 133 separates L multipath components from a signal output from the $N^{th}$ RF processor 132, and the separated L multipath components are output to the first finger 140-1 to the $L^{th}$ finger 140-L, respectively.

Accordingly, among the L multipath signals for the signals received via the N reception antennas, the same multipath signals are input to the same fingers. For example, first multipath signals from the first reception antenna 111 to the $N^{th}$ reception antenna 131 are input to the first finger 140-1. The $L^{th}$ multipath signals from the first reception antenna 111 to the $N^{th}$ reception antenna 131 are input to the $L^{th}$ finger 140-L. The first finger 140-1 to the $L^{th}$ finger 140-L are different only in signals input thereto and output therefrom, and are identical in structure and operation. Therefore, for simplicity, only the first finger 140-1 will be described herein below.

The first finger 140-1 includes N despreaders, i.e., a first despreader 141, a second despreader 142, . . . , and an $N^{th}$ despreader 143, that are mapped to the N multipath searchers, a signal processor 144 for calculating a reception beam weight vector for generating a reception beam using signals received from the N despreaders, and a reception beam generator 145 for generating a reception beam using the reception beam weight vector calculated by the signal processor 144.

A first multipath signal output from the first multipath searcher 113 is input to the first despreader 141 The first despreader 141 despreads the first multipath signal output from the first multipath searcher 113 with a predetermined spreading code, and outputs the despread multipath signal to the signal processor 144 and the reception beam generator 145. The despreading process is called "temporal processing."

Similarly, a first multipath signal output from the second multipath searcher 123 is input to the second despreader 142. The second despreader 142 despreads the first multipath signal output from the second multipath searcher 123 with a predetermined spreading code, and outputs the despread multipath signal to the signal processor 144 and the reception beam generator 145. Accordingly, a first multipath signal output from the $N^{th}$ multipath searcher 133 is input to the $N^{th}$ despreader 143. The $N^{th}$ despreader 143 despreads the first multipath signal output from the $N^{th}$ multipath searcher 133 with a predetermined spreading code, and outputs the despread multipath signal to the signal processor 144 and the reception beam generator 145.

The signal processor 144 receives the signals output from the first despreader 141 to the $N^{th}$ despreader 143, and calculates a reception beam weight set $\underline{W}_k$ for generating a reception beam. Here, a set of first multipath signals output from the first multipath searcher 113 to the $N^{th}$ multipath searcher 133 will be defined as "$\underline{X}_k$." The first multipath signal set $\underline{X}_k$ represents a set of first multipath signals received via the first reception antenna 111 to the $N^{th}$ reception antenna 131 at a $k^{th}$ point, and the first multipath signals included in the first multipath signal set $\underline{X}_k$ are all vector signals. The reception beam weight set $\underline{W}_k$ represents a set of reception beam weights to be applied to the first multipath signals received via the first reception antenna 111 to the $N^{th}$ reception antenna 131 at the $k^{th}$ point. The reception beam weights constituting the weight set $\underline{W}_k$ are all vector signals.

A set of signals determined by despreading all of the first multipath signals in the first multipath signal set $\underline{X}_k$ will be defined as $\underline{y}_k$. The despread signal set $\underline{y}_k$ of the first multipath signals represents a set of signals determined by despreading the first multipath signals received via the first reception antenna 111 to the $N^{th}$ reception antenna 131 at the $k^{th}$ point, and the despread signals included in the despread signal set $\underline{y}_k$ of the first multipath signals are all vector signals. Herein, for the convenience of explanation, the term "set" will be omitted, and the underlined parameters represent sets of corresponding elements.

Each of the first despreaders 141 to the $N^{th}$ despreaders 143 despreads the first multipath signal $\underline{X}_k$ with a predetermined despreading code, such that reception power of a desired reception signal is higher than reception power of an interference signal by a process gain. The despreading code is identical to the spreading code used in transmitters of the mobile stations.

As described above, the despread signal $\underline{y}_k$ of the first multipath signal $\underline{X}_k$ is input to the signal processor 144. The signal processor 144 calculates a reception beam weight $\underline{W}_k$ with the despread signal $\underline{y}_k$ of the first multipath signal $\underline{X}_k$, and outputs the reception beam weight $\underline{W}_k$ to the reception beam generator 145. More specifically, the signal processor 144 calculates the reception beam weight $\underline{W}_k$ including a total of N reception beam weight vectors applied to the first multipath signal $\underline{X}_k$ output from the first reception antenna 111 to the $N^{th}$ reception antenna 131, with the despread signals $\underline{y}_k$ of a total of N first multipath signals output from the first reception antenna 111 to the $N^{th}$ reception antenna 131. The reception beam generator 145 receives the despread signals $\underline{y}_k$ of a total of the N first multipath signals $\underline{X}_k$ and a total of the N weight vectors $\underline{W}_k$. Thereafter, the reception beam generator 145 generates a reception beam with a total of the N reception beam weight vectors $\underline{W}_k$, calculates a scalar product of the despread signal $\underline{y}_k$ of the first multipath signal $\underline{X}_k$ and the reception beam weight $\underline{W}_k$ corresponding to the reception beam, and outputs the result as an output $z_k$ of the first finger 140-1. The output $z_k$ of the first finger 140-1 can be expressed in Equation (1).

$$z_k = \underline{w}_k^H \underline{y}_k \qquad (1)$$

In Equation (1), H denotes a Hermitian operator, i.e., a conjugate-transpose. A set $\underline{z}_k$ of output signals $z_k$ from L fingers in the base station receiver is finally input to the multipath combiner 150.

Although only the first finger 140-1 has been described, the other fingers (140-2 to 140-L) operate in the same way as the first finger 140-1. Accordingly, a description of the operating procedure for second finger 140-2 to the $L^{th}$ finger 140-L will not be given herein.

The multipath combiner 150 combines the signals output from the first finger 140-1 to the $L^{th}$ finger 140-L, and outputs the combined signal to the deinterleaver 160. The deinterleaver 160 deinterleaves the signal output from the multipath combiner 150 in a deinterleaving method corresponding to the interleaving method used in the transmitter, and outputs the deinterleaved signal to the decoder 170. The decoder 170 decodes the signal output from the deinterleaver 160 in a decoding method corresponding to the encoding method used in the transmitter, and outputs the decoded signal as final reception data.

The signal processor 144 calculates a reception beam weight $\underline{W}_k$ such that a Mean Square Error (MSE) of a signal received from a mobile station transmitter, desired to be received by a predetermined algorithm, becomes minimized. The reception beam generator 145 generates a reception beam using the reception beam weight $\underline{W}_k$ generated by the signal processor 144. The process of generating a reception beam such that MSE becomes minimized is called "spatial processing." Therefore, when Rx-AAA is used in a CDMA mobile communication system, temporal processing and spatial processing are simultaneously performed. The operation of simultaneously performing temporal processing and spatial processing is called "spatial-temporal processing."

The signal processor 144 receives multipath signals despread for each finger as described above, and calculates a reception beam weight capable of maximizing a gain of the Rx-AAA according to a predetermined algorithm. The signal processor 144 minimizes the MSE. Therefore, a study is actively being conducted on a reception beam weight calculation algorithm for adaptively minimizing the MSE. However, the reception beam weight calculation algorithm for adaptively minimizing the MSE is an algorithm for reducing errors on the basis of a reference signal, and this algorithm supports a Constant Modulus (CM) technique and a Decision-Directed (DD) technique as a blind technique, when there is no reference signal.

However, the algorithm for reducing errors on the basis of a reference signal is difficult to converge into a minimum MSE value desired by the system in an environment where a channel such as a fast fading channel suffers from a rapid change, or an environment in which a high-order modulation scheme such as 16-ary quadrature amplitude modulation (16QAM) is used. Even though it converges into a particular MSE value, the minimum MSE value is set to a relatively large value. When the minimum MSE value is set to a relatively large value, a gain occurring by the use of the Rx-AAA is reduced. Therefore, this algorithm is not suitable for a high-speed data communication system.

Further, the conventional reception beam weight calculation algorithm for beam generation uses a Time-Domain Gradient technique. The Time-Domain Gradient technique utilizes a fixed reception beam weight step in calculating the reception bean weight. When the reception beam weight is calculated using the fixed reception beam weight step, if a mobile station moves at relatively high speed, i.e., if a channel environment suffers abrupt change, the convergence rate (or convergence speed) is reduced. The reduction in convergence rate decreases a rate of convergence to the minimum MSE value desired in the system. Therefore, this algorithm is also not suitable for a high-speed data communication system.

SUMMARY OF THE INVENTION

It is, therefore, an object of the present invention to provide an apparatus and method for receiving data using Adaptive Antenna Array technology in a mobile communication system.

It is another object of the present invention to provide an apparatus and method for receiving data using a reception beam weight generation scheme having an adaptive reception beam weight step in a mobile communication system utilizing Adaptive Antenna Array technology.

In accordance with a first aspect of the present invention, there is provided an apparatus for receiving a signal in a base station having at least one reception antenna. The apparatus includes: a despreader for receiving a reception signal and despreading the reception signal; a signal processor for calculating an error value representative of a difference between the reception signal and a desired reception signal using a combined technique of a first technique and a second technique by receiving the despread signal, calculating a reception beam weight step value using the error value and an output signal generated by applying a previous reception beam weight to the despread signal, and calculating a difference between the previous reception beam weight and a product of the reception beam weight step value, the despread signal and a conjugate value of the error value, as a current reception beam weight; and a reception beam generator for generating the reception beam using the despread signal and the reception beam weight, and generating the output signal by applying the reception beam to the despread signal.

In accordance with a second aspect of the present invention, there is provided an apparatus for generating an optimal reception beam weight such that a reception beam becomes an optimal reception beam in a direction of a reception signal, in a base station having at least one reception antenna. The base station generates a reception beam of the reception antenna using a previous reception beam weight and a despread signal of a current reception signal, calculates an error value indicating a difference between the current reception signal and a desired reception signal, and calculates a current reception beam weight using the previous reception beam weight, the despread signal, and the error value. The apparatus includes: a reception beam weight step calculator for calculating a reception beam weight step value using the error value and an output signal generated by applying the reception beam weight to the despread signal; and a reception beam weight calculator for calculating a difference between the previous reception beam weight and a product of the reception beam weight step value, the despread signal and a conjugate value of the error value, as the current reception beam weight.

In accordance with a third aspect of the present invention, there is provided an apparatus for generating an optimal reception beam weight such that a reception beam becomes an optimal reception beam in a direction of a reception signal, in a base station having at least one reception antenna. The base station generates a reception beam of the reception antenna using a previous reception beam weight and a current reception signal, calculates an error value indicating a difference between the current reception signal and a desired reception signal, and calculates a current reception beam weight using the previous reception beam weight, the current reception signal, and the error value. The apparatus includes: a reception beam weight step calculator for calculating a reception beam weight step value using the error value and an output signal generated by applying the reception beam weight to the reception signal; and a reception beam weight calculator for calculating a difference between the previous reception beam weight and a product of the reception beam weight step value, the reception signal and a conjugate value of the error value, as the current reception beam weight.

In accordance with a fourth aspect of the present invention, there is provided a method for receiving a signal in a base station having at least one reception antenna. The method includes: receiving a reception signal and despreading the reception signal; calculating an error value representative of a difference between the reception signal and a desired reception signal using a combined technique of a first technique and a second technique by receiving the despread signal; calculating a reception beam weight step value using the error value and an output signal generated by applying a previous reception beam weight to the despread signal; calculating a difference between the previous reception beam weight and a product of the reception beam weight step value, the despread signal and a conjugate value of the error value, as a current reception beam weight; generating the reception beam using the despread signal and the reception beam weight; and generating the output signal by applying the reception beam to the despread signal.

In accordance with a fifth aspect of the present invention, there is provided a method for receiving a signal in a base station having at least one reception antenna. The method includes: calculating an error value representative of a difference between a reception signal and a desired reception signal using a combined technique of a first technique and a second technique by receiving the reception signal; calculating a reception beam weight step value using the error value and an output signal generated by applying a previous reception beam weight to the reception signal; calculating a difference between the previous reception beam weight and a product of the reception beam weight step value, the reception signal and a conjugate value of the error value, as a current reception beam weight; generating the reception beam using the reception signal and the reception beam weight; and generating the output signal by applying the reception beam to the reception signal.

In accordance with a sixth aspect of the present invention, there is provided a method for generating an optimal reception beam weight such that a reception beam becomes an optimal reception beam in a direction of a reception signal, in a base station having at least one reception antenna. The base station generates a reception beam of the reception antenna using a previous reception beam weight and a despread signal of a current reception signal, calculates an error value indicating a difference between the current reception signal and a desired reception signal, and calculates a current reception beam weight using the previous reception beam weight, the despread signal, and the error value. The method includes: generating a reception beam weight step value using the error value and an output signal generated by applying the reception beam weight to the despread signal; calculating a difference between the previous reception beam weight and a product of the reception beam weight step value, the despread signal and a conjugate value of the error value, as the current reception beam weight; and selecting the reception beam weight step value such that the current reception beam weight becomes the optimal reception beam.

In accordance with a seventh aspect of the present invention, there is provided a method for generating an optimal reception beam weight such that a reception beam becomes an optimal reception beam in a direction of a reception signal, in a base station having at least one reception antenna. The base station generates a reception beam of the reception antenna using a previous reception beam weight and a current reception signal, calculates an error value indicating a difference between the current reception signal and a desired reception signal, and calculates a current reception beam weight using the previous reception beam weight, the current reception signal, and the error value. The method includes: generating a reception beam weight step value using the error value and an output signal generated by applying the reception beam weight to the reception signal; calculating a difference between the previous reception beam weight and a product of the reception beam weight step value, the reception signal and a conjugate value of the error value, as the current reception beam weight; and selecting the reception beam weight step value such that the current reception beam weight becomes the optimal reception beam.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

Figure 1:
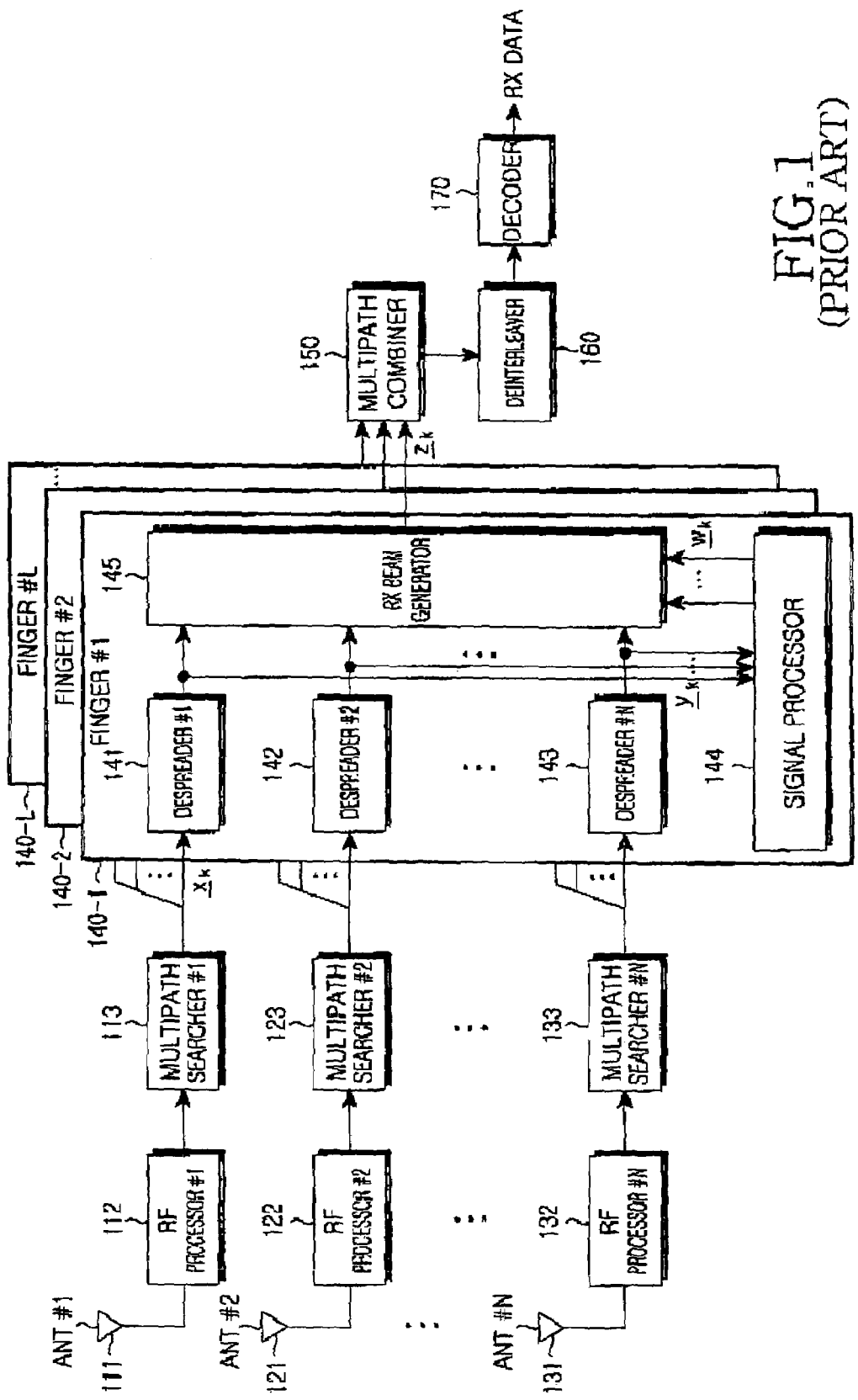
FIG. 1 is a block diagram illustrating a structure of a base station receiver in a conventional CDMA mobile communication system.

Preferred embodiments of the present invention will now be described in detail herein below with reference to the annexed drawings. In the following description, a detailed description of known functions and configurations incorporated herein has been omitted for conciseness.

However, before a description of the present invention is given, a model of a reception signal received at a receiver of a base station (BS) will be considered. It will be assumed that a receiver of the base station includes a receive-antenna array having a plurality of reception antennas (Rx ANTs). The receive-antenna array is generally mounted only in the receiver of the base station considering its cost and size, and is not mounted in a receiver of a mobile station (MS). That is, it is assumed that the receiver of the mobile station includes only one reception antenna.

Additionally, although the present invention can be applied to all of mobile communication systems using Frequency Division Multiple Access (FDMA), Time Division Multiple Access (TDMA), Code Division Multiple Access (CDMA), and Orthogonal Frequency Division Multiplexing (OFDM), the present invention will be described with reference to a mobile communication system using OFDM (hereinafter referred to as an "OFDM mobile communication system").

A signal transmitted from a transmitter of an $m^{th}$ mobile station existing in a cell serviced by the base station is expressed as shown in Equation (2).

$$s_m(t) = \sqrt{p_m} b_m(t) c_m(t) \quad (2)$$

In Equation (2), $s_m(t)$ denotes a transmission signal of an $m^{th}$ mobile station, $p_m$ denotes transmission power of the $m^{th}$ mobile station, $b_m(t)$ denotes a user information bit sequence of the $m^{th}$ mobile station, and $c_m(t)$ denotes a user spreading code sequence of the $m^{th}$ mobile station, having a chip period of $T_c$.

The transmission signal transmitted from the mobile station transmitter is received at a receiver of the base station over a multipath vector channel. It is assumed that channel parameters of the multipath vector channel are changed at relatively low speed, compared with the bit period $T_b$. Therefore, it is assumed that the channel parameters of the multipath vector channel are constant for certain bit periods. A complex baseband reception signal for a first multipath of an $m^{th}$ mobile station, received at a receiver of the base station, is expressed by Equation (3). It should be noted that the reception signal of Equation (3) represents a baseband signal determined by down-converting a radio frequency (RF) signal received at the base station receiver.

$$\underline{x}_{m1}(t) = \alpha_{m1} e^{j\phi_{m1}} b_m(t-\tau_{m1}) c_m(t-\tau_{m1}) \underline{a}_{m1} \quad (3)$$

In Equation (3), $\underline{x}_{mt}$ denotes a set of complex baseband reception signals received through a first multipath of the $m^{th}$ mobile station, $\alpha_{m1}$ denotes a fading attenuation applied to the first multipath of the $m^{th}$ mobile station, $\phi_{m1}$ denotes a phase transition applied to the first multipath of the $m^{th}$ mobile station, $\tau_{m1}$ denotes a time delay applied to the first multipath of the $m^{th}$ mobile station, and $\underline{a}_{m1}$ denotes a set of array responses (ARs) applied to the first multipath of the $m^{th}$ mobile station. Because the base station receiver includes a plurality of reception antennas, for example, N, a signal transmitted by the $m^{th}$ mobile station is received at the base station receiver via the N reception antennas. Therefore, the number of signals received via the first multipath is N, and N complex baseband reception signals received via the first multipath of the $m^{th}$ mobile station constitute a set of the reception signals. Herein, as indicated above, for the convenience of explanation, the term "set" will be omitted, and the underlined parameters represent sets of corresponding elements.

When a current linear antenna array is used, the array response $\underline{a}_{m1}$ is defined as shown in Equation (4)

$$\underline{a}_{ml} = \left[1 \; e^{j2\pi\frac{d}{\lambda}\sin\theta_{ml}} \; \ldots \; e^{j2\pi\frac{d}{\lambda}(N-1)\sin\theta_{ml}}\right]^T \quad (4)$$

In Equation (4), 'd' denotes a distance between separated reception antennas, $\lambda$ denotes a wavelength at a frequency band in use, N denotes the number of the reception antennas, and $\theta_{m1}$ denotes direction-of-arrival (DOA) applied to the first multipath of the $m^{th}$ mobile station.

If it is assumed that the number of mobile stations existing in a cell serviced by the base station is M and there are L multiple paths for each of the M mobile stations, a reception signal received at the base station becomes the sum of transmission signals transmitted from the M mobile stations and additive white noises (AWN), as represented in Equation (5).

$$\underline{x}(t) = \sum_{m=1}^{M}\sum_{l=1}^{L} \underline{x}_{ml}(t) + \underline{n}(t) \qquad (5)$$

In Equation (5), $\underline{n}(t)$ denotes a set of the additive white noises added to the transmission signals transmitted from the M mobile stations.

It is assumed that a signal the base station desires to receive in the reception signal of Equation (5) is $\underline{x}_{11}$. The $\underline{x}_{11}$ represents a signal a first mobile station has transmitted via a first multipath. Because it is assumed that a signal the base station desires to receive is $\underline{x}_{11}$, all signals except the signal $\underline{x}_{11}$ are regarded as interference signals and noise. Accordingly, Equation (5) can be rewritten as shown in Equation (6).

$$\underline{x}(t)=\alpha_{11}e^{j\phi_{11}}b_1(t-\tau_{11})c_1(t-\tau_{11})\underline{a}_{11}+\underline{i}(t)+\underline{n}(t) \qquad (6)$$

In Equation (6), $\underline{i}(t)$ denotes an interference signal, which is defined in Equation (7).

$$\underline{i}(t) = \sum_{l=2}^{L}\underline{x}_{1l}(t) + \sum_{m=2}^{M}\sum_{l=1}^{L}\underline{x}_{ml}(t) \qquad (7)$$

The first term $$\sum_{l=2}^{L}\underline{x}_{1l}(t)$$

of Equation (7) is a transmission signal of a mobile station that the base station desires to receive, but represents the inter-path interference (IPI) by other multiple paths that the base station does not desire to receive. The second term $$\sum_{m=2}^{M}\sum_{l=1}^{L}\underline{x}_{ml}(t)$$

of Equation (7) represents the multiple access interference (MAI) by other mobile stations.

Further, the $\underline{x}(t)$ is despread with a despreading code $c_1(t-\tau_{11})$ previously set in a first finger (l=1) for a corresponding multipath in a corresponding channel card of the base station receiver, i.e. a channel card (m=1) assigned to the first mobile station, and the despread signal $\underline{y}(t)$ is defined in Equation (8). The despreading code $c_1(t-\tau_{11})$ is identical to the despreading code $c_1(t-\tau_{11})$ used in a base station transmitter during signal transmission. The base station includes a plurality of receivers described in conjunction with FIG. 1. Each of the receivers is called a "channel card," and one channel card is assigned to one mobile station. As described in connection with FIG. 1, the channel card includes as many fingers as the number of multiple paths, and the fingers are mapped to corresponding multipath signals on a one-to-one basis.

$$\underline{y}(k) = \int_{(k-1)T_b+\tau_{11}}^{kT_b+\tau_{11}} \underline{x}(t)c_1^*(t-\tau_{11})dt \qquad (8)$$

In Equation (8), 'k' denotes a $k^{th}$ sampling point.

When the signal $\underline{y}(t)$ is generated by despreading the pre-despread signal $\underline{x}(t)$ with the despreading code $c_1(t-\tau_{11})$, the power of a signal component the base station receiver desires to receive from among the reception signals is amplified by a gain G according to a characteristic of a despreader. It is noted that although the power of a signal component the base station receiver desires to receive is amplified by a process gain G, the power of the signal components the base station receiver does not desire to receive is not changed at all. Therefore, a correlation matrix between a reception signal before despreading and a reception signal after despreading can be calculated.

In order to calculate the correlation matrix between a reception signal before despreading and a reception signal after despreading, the reception signal $\underline{x}(t)$ before despreading is sampled at a $k^{th}$ point, which is equal to the sampling point of the reception signal $\underline{y}(t)$ after despreading. The signal obtained by sampling the reception signal $\underline{x}(t)$ before despreading at the $k^{th}$ point is represented in Equation (9).

$$\underline{x}(k)=\alpha_{11}e^{j\phi_{11}}b_{1k}c_{1k}\underline{a}_{11}+\underline{i}_k\underline{n}_k \qquad (9)$$

Therefore, in order to calculate a correlation matrix between a reception signal $\underline{x}(t)$ before despreading and a reception signal $\underline{y}(t)$ after despreading, it is assumed that the signal of Equation (9) is acquired by sampling the reception signal $\underline{x}(t)$ before despreading at the $k^{th}$ point, which is equal to the sampling point of the reception signal $\underline{y}(t)$ after despreading.

A description of a 2-step Least Mean Square (LMS) technique and a 2-step Minimum Mean Square Error (MMSE) technique will now be made herein below.

In the 2-step LMS technique, a set of reception signals before despreading, including complex reception signals received via N reception antennas at a particular time, i.e. complex reception signals $x_1$ to $x_N$ received via a first reception antenna to an $N^{th}$ reception antenna, are defined as $\underline{x}=[x_1,x_2, \ldots ,x_N]^T$. 'T' is an operator representing a transpose operation. In addition, a set of reception signals after despreading the complex reception signals $x_1, x_2, \ldots , x_N$ received via the N reception antennas will be defined as $\underline{Y}=[y_1,y_2, \ldots , y_N]^T$. The reception signal $\underline{y}$ after despreading is determined by the sum of a signal component $\underline{s}$ the base station receiver desires to receive and a signal component $\underline{u}$ the base station receiver does not desire to receive, as represented in Equation (10).

$$\underline{y}=\underline{s}+\underline{u} \qquad (10)$$

A set of complex reception beam weights to be multiplied by the complex reception signals $x_1, x_2, \ldots , x_N$ received via the N reception antennas, i.e., complex reception beam weights $w_1$ to $w_N$ to be multiplied by complex reception signals $x_1$ to $x_N$ received via the first reception antenna to the $N^{th}$ reception antenna, will be defined as $\underline{w}=[w_1, w_2, \ldots ,w_N]^T$.

Additionally, an output signal $\underline{z}$ from fingers in a particular user card, i.e., a channel card assigned to a particular mobile station, is determined by calculating a scalar product of the reception beam weight $\underline{w}$ and the reception signal $\underline{y}$ after despreading, as represented in Equation (11).

$$z = \underline{w}^H \underline{y} = \sum_{i=1}^{N} w_i^* y_i \quad (11)$$

In Equation (11), 'i' denotes the number of reception antennas.

The output signal z can be classified into a signal component $\underline{w}^H \underline{s}$ the base station receiver desires to receive, and a signal component $\underline{w}^H \underline{u}$ the base station receiver does not desire to receive, using Equation (10) and Equation (11). The LMS technique minimizes an error between a known reference signal and a reception signal, and particularly, minimizes a cost function J(w) given below in Equation (12).

$$J(\underline{w}) = (e_k)^2 \quad (12)$$
$$e_k = d_k - z_k$$

In Equation (12), 'J' denotes a cost function, and a weight value $\underline{w}$ for minimizing the cost function value J must be determined. Further, in Equation (12), $e_k$ denotes a difference, or an error, between a reception signal and a desired reception signal, and $d_k$ denotes the desired signal. In a beam generation algorithm using a non-blind technique, a pilot signal is used as the desired signal $d_k$ by way of example. However, the present invention proposes a beam generation algorithm using a blind technique. Therefore, a detailed description of the beam generation algorithm using the non-blind technique will be omitted.

In Equation (12), the cost function J is a type of a second-order convex function. Therefore, in order to minimize the cost function J, the cost function J must be differentiated so that its value becomes 0. A differentiated value of the cost function J is shown in Equation (13).

$$\nabla J = -2 e_k^* \underline{v}_k \quad (13)$$

However, it is difficult to acquire an optimal reception beam weight $\underline{w}^{opt}$ in an actual channel environment in a single process, and because the reception signal $\underline{y}$ after despreading is input at each point, a recursive formula of Equation (14) should be used in order to adaptively or recursively acquire the optimal reception beam weight $w^{opt}$.

$$\underline{w}_{k+1} = \underline{w}_k + \mu \underline{v}_k \quad (14)$$

In Equation (14), 'k' denotes a $k^{th}$ point, $\underline{w}_k$ denotes a reception beam weight at the $k^{th}$ point, μ denotes a weight step having a constant value, and $\underline{v}_k$ denotes a trace vector at the $k^{th}$ point. The trace vector $\underline{v}_k$ at the $k^{th}$ point represents a vector for converging a differentiated value of the cost function J to a minimum value, for example, 0.

That is, Equation (14) shows a process of updating a value generated before or after a constant gain μ from the reception beam given weight wk to be used at a current point in a direction of the trace vector $\underline{v}_k$ as a reception beam weight $\underline{w}_{k+1}$ to be used at the next point.

In addition, in view of Mean Square (MS), Equation (14) is rewritten as shown in Equation (15).

$$\underline{w}_{k+1} = \underline{w}_k - \mu \underline{y}_k e_k^* \quad (15)$$

In Equation (14) and Equation (15), the weight step μ has a constant value, or a fixed value. However, the present invention proposes that the weight step μ has a value adaptive to a channel variation rate in order to resolve the problem occurring because that the weight step μ has a fixed value, i.e., the problem that a high channel variation rate reduces a convergence rate, decreasing a rate of convergence to a minimum MSE value, thereby making it unsuitable for a high-speed data communication system.

The weight step μ proposed in the present invention is defined as shown in Equation (16).

$$\mu = \mu_0 \exp\left(\frac{\|z_k e_k^*\|_2}{\|z_k\|_2}\right) \quad (16)$$

In Equation (16), $\mu_0$ denotes a weight step having a fixed value described above, i.e., a constant gain. As illustrated in Equation (16), the weight step μ exponentially increases as an error level $e_k$ increases. That is, in a region where the error level is relatively high, a value of the weight step μ is set to a relatively large value, and in a region where the error level is relatively low, a value of the weight step μ is set to a relatively small value, thereby increasing the convergence rate.

A scheme proposed herein for detecting a desired reception signal d(k) is a blind technique, and as the blind technique is used, a particular estimation value must be used such that a reception signal should be adaptively converged. For adaptively converging a reception signal, an exponentially-increasing adaptive weight step μ is used. A method for detecting a desired reception signal d(k) using a weight step μ proposed in the present invention will now be described herein below.

A mixed-mode blind technique is used as a technique for detecting a desired reception signal d(k). In this case, an error function can be expressed as shown in Equation (17).

$$e_k = \alpha_k \cdot e_k^{CM} + \beta_k \cdot e_k^{DD} \quad (17)$$
$$\alpha_k = g(|e_k^{DD}|),$$
$$\beta_k = (1 - g(|e_k^{DD}|)) \frac{|e_k^{CM}|}{|e_k^{DD}|},$$
$$g(x) = \frac{1}{1 + e^{-a(x-0.5)}}, a > 0$$

In Equation (17), $e_k^{CM}$ and $e_k^{DD}$ denote error values detected by applying a Constant Modulus (CM) technique and a Decision-Directed (DD) technique used for adaptive convergence of the reception signal, respectively. A description of $e_k^{CM}$ and $e_k^{DD}$ will be given herein below.

As shown in Equation (17), it can be understood that the $e_k^{CM}$ and $e_k^{DD}$ can be detected by applying a combination of the CM technique and the DD technique throughout an adaptive convergence operation of a reception signal. That is, if a value $e_k^{DD}$ increases, a value $$g(|e_k^{DD}|)$$

also increases, such that an influence of the DD technique in the entire error value increases. Further, in Equation (17), because g(x) is an s-shaped function (hereinafter referred to as a "sigmoid function"), an influence of the DD technique is reduced in a region where an influence of the CM technique is dominant. Conversely, an influence of the CM technique is reduced in a region where an influence of the DD technique is dominant.

Moreover, in Equation (17), the error value $e_k$ is determined by combining a value determined by weighting an error value $e_k^{CM}$ of the reception signal calculated using the CM technique by $\alpha^k$ with a value determined by weighting an error value $e_k^{DD}$ calculated using the DD technique by $\beta^k$. Here, the $\alpha^k$ denotes a weight applied to the CM technique and will be referred to as a "CM-applied weight," and the $\beta^k$ denotes a weight applied to the DD technique, which will be referred to as a "DD-applied weight." As a result, the error value $e_k$ is an error value detected by adaptively setting the CM-applied weight $\alpha^k$ and the DD-applied weight $\beta^k$ according to whether it is converged.

Figure 2:
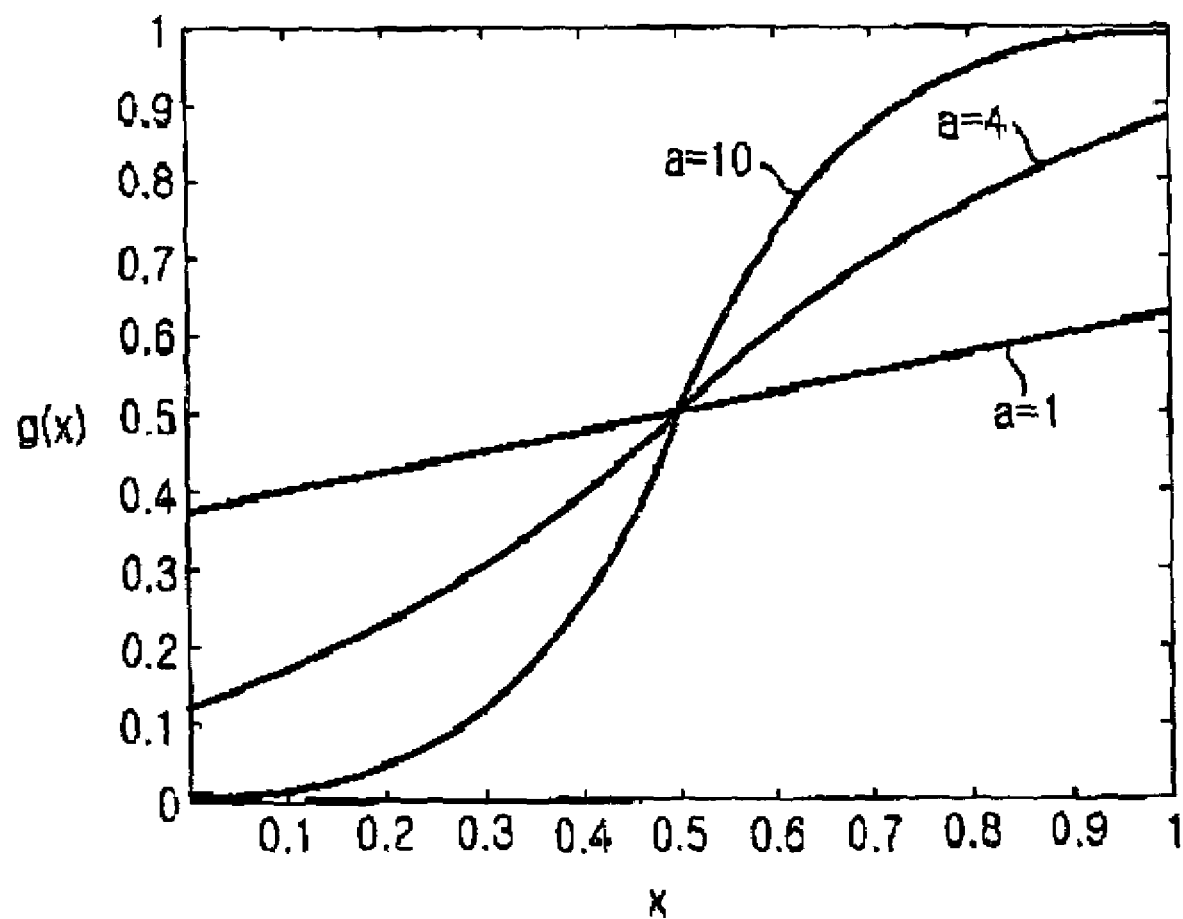
FIG. 2 is a diagram illustrating a characteristic of a sigmoid function used in the present invention.

FIG. 2 is a diagram illustrating a characteristic of a sigmoid function used in the present invention. Referring to FIG. 2, an s-shaped characteristic is changed according to a value 'a'. That is, if a value 'a' increases, a shape of the function is close to a shape of the letter 's', and if a=1, a shape of the function is close to a straight line. The sigmoid function is characterized in that if the CM-applied weight $\alpha^k$ increases, the DD-applied weight $\beta^k$ decreases, and if the CM-applied weight $\alpha^k$ decreases, the DD-applied weight $\beta^k$ increases. That is, if the error value $e_k^{CM}$ of a reception signal calculated using the CM technique exceeds an error value $e_k^{DD}$ calculated using the DD technique, the error value $e_k$ of the reception signal is calculated by combining a weighted CM technique with a weighted DD technique further weighted as compared with the weighted CM technique. Herein, the "weighted CM technique" refers to a CM technique given by applying the CM-applied weight $\alpha^k$ to the CM technique, and the "weighted DD technique" refers to a DD technique given by applying the DD-applied weight $\beta^k$ to the DD technique. In addition, the "weighted DD technique further weighted as compared with the weighted CM technique" refers to a DD technique to which a DD-applied weight $\beta^k$ being greater than a CM-applied weight $\alpha^k$ applied to the CM technique is applied, and the "weighted CM technique further weighted as compared with the weighted DD technique" refers to a CM technique to which a CM-applied weight $\alpha^k$ being greater than a DD-applied weight $\beta^k$ applied to the DD technique is applied. If the error value $e_k^{CM}$ of a reception signal calculated using the CM technique is smaller than or equal to the error value $e_k^{DD}$ calculated using the DD technique, it indicates that the weighted DD technique is combined with the weighted CM technique further weighted as compared with the weighted DD technique.

The CM technique is generally used in a blind equalizer, and also used in a beam generation algorithm. When the CM technique proposed by Godard is used, a cost function J is expressed as in Equation (18).

$$J_{Godard} = E[(|z_n|^p - R_p)^2] \quad (18)$$

In Equation (18), 'p' denotes a random positive integer, and $R_p$ denotes a Godard Modulus, which is defined in Equation (19).

$$R_p = \frac{E[|z_n|^{2p}]}{E[|z_n|^p]} \quad (19)$$

Because the current OFDM mobile communication system generally uses a high-order modulation scheme, which is higher in order than quadrature phase shift keying (QPSK) modulation, the cost function J is separated into a real part and an imaginary part as shown below in Equation (20). The cost function J is separated into a real part and an imaginary part because due to the use of the high-order modulation scheme, transmission/reception signals have a real part and an imaginary part.

$$J = J_R + J_I \quad (20)$$
$$J_R = E[(z_{n,R}^2 - R_{2,R})^2], \quad J_I = E[(z_{n,I}^2 - R_{2,I})^2]$$
$$R_{2,R} = \frac{E[z_{n,R}^4]}{E[z_{n,R}^2]}, \quad R_{2,I} = \frac{E[z_{n,I}^4]}{E[z_{n,I}^2]}$$

It is assumed herein that the present invention uses the LMS technique and p=2. Therefore, $d(k)=R_{2,R}+jR_{2,I}$. In addition, it is assumed that a cost function value J at an initial point, i.e. a k=0 point, is 0 (J=0). This will be described in more detail herein below with reference to FIG. 5.

Figure 5:
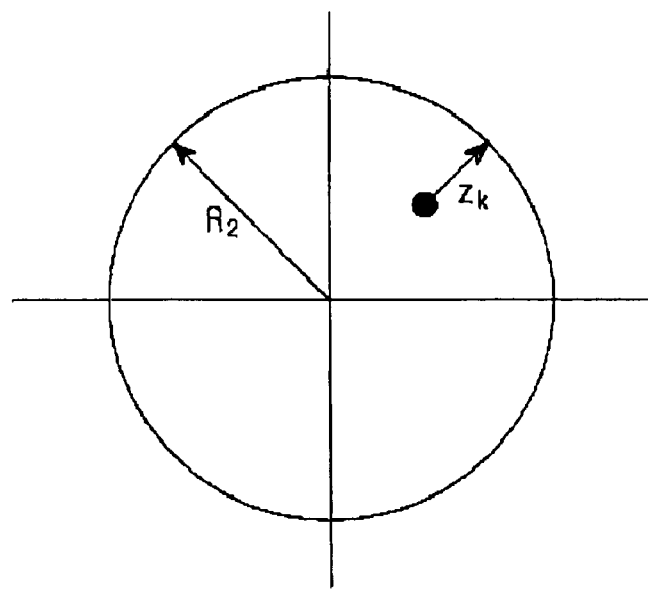
FIG. 5 is a diagram schematically illustrating a CM technique in an OFDM mobile communication system for p=2, d(k)=$R_{2,R}$+j$R_{2,I}$, and J=0 (for k=0)
Figure 6:
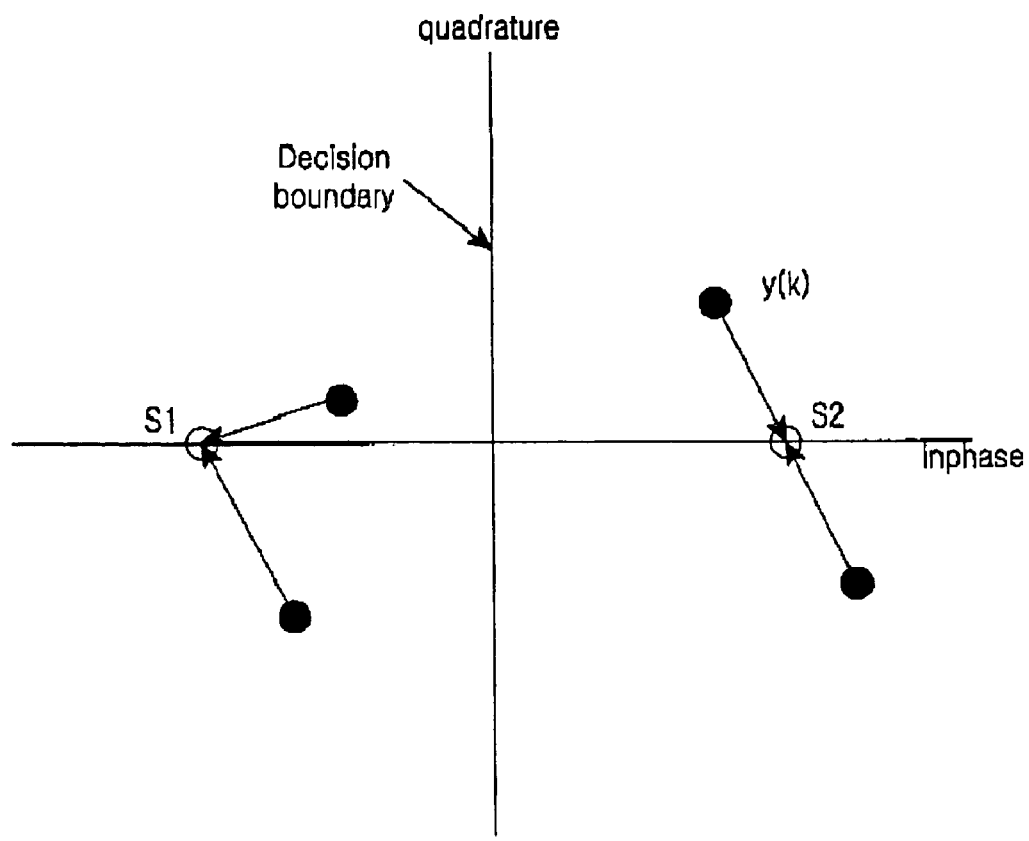
FIG. 6 is a diagram schematically illustrating a DD technique in an OFDM mobile communication system using Binary Phase Shift Keying (BPSK)

FIG. 5 is a diagram schematically illustrating a CM technique in an OFDM mobile communication system for p=2, $d(k)=R_{2,R}+jR_{2,I}$, and J=0 (for k=0). FIG. 6 illustrates a CM technique for p=2, $d(k)=R_{2,R}+jR_{2,I}$, and J=0 at a point k=0. That is, if a value $R_2$ is determined by Equation (20), a circle is generated on a coordinate surface. Then, a received signal is determined as a point where an extension line drawn from the origin meets the circle. In FIG. 5, received $z_k$ is projected as a circle.

Even in the DD technique, like in the CD technique, a real part and an imaginary part should be separately calculated. In Equation (21), Pr indicates that a received signal is projected as a signal most approximating the desired reception signal d(k) by the DD technique. Herein, the DD technique is a technique for reflecting the d(k) as a decision value most approximating the received signal.

$$d_R(k)=Pr[Re(z(k))] d_I(k)=Pr[Im(z(k))] \quad (21)$$

FIG. 6 is a diagram schematically illustrating a DD technique in an OFDM mobile communication system using Binary Phase Shift Keying (BPSK). Referring to FIG. 6, because it is assumed that the OFDM mobile communication system uses BPSK, if a reception signal is (1.2, −0.2) in an I-Q domain, the desired reception signal d(k) is projected as the most approximate value of 1 after calculating a distance from +1 and −1.

Figure 3:
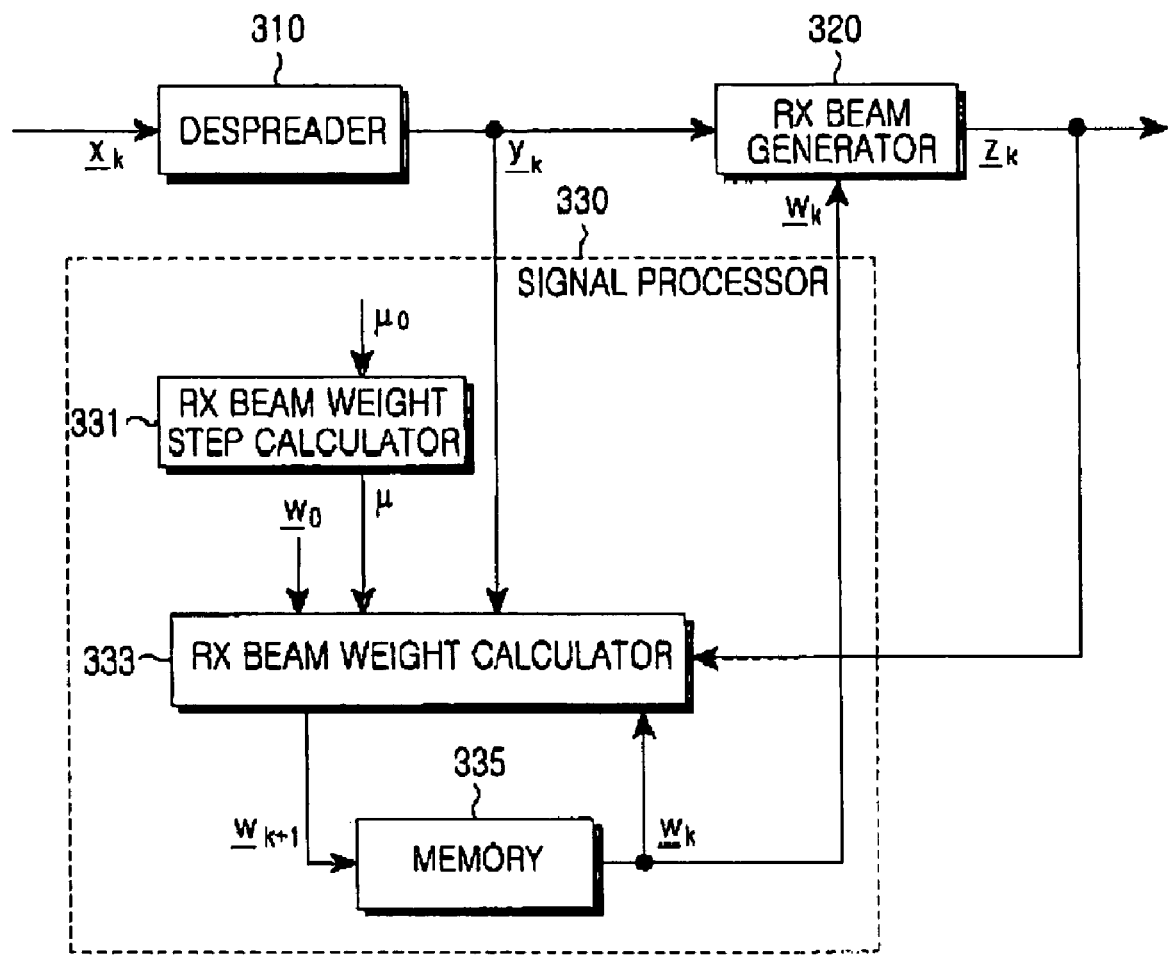
FIG. 3 is a block diagram illustrating a structure of a base station receiver according to an embodiment of the present invention.

FIG. 3 is a block diagram illustrating a structure of a base station receiver according to an embodiment of the present invention. While describing FIG. 3, it should be noted that a base station receiver according to the embodiment of the present invention is similar in structure to the base station receiver described in connection with FIG. 1, but different in a method for determining a weight by a signal processor. For simplicity, only the elements directly related to the present invention in the base station receiver will be described with reference to FIG. 3.

Referring to FIG. 3, when a reception signal $\underline{x}_k$ at a point k is received, a despreader 310 despreads the reception signal $\underline{x}_k$ using a predetermined despreading code, and outputs the despread reception signal $\underline{y}_k$ to a signal processor 330 and a reception beam generator 320. The signal processor 330 includes a reception beam weight step calculator 331, a reception beam weight calculator 333, and a memory 335.

For simplicity, FIG. 3 will be described with reference to only the first finger 140-1 in the base station receiver of FIG. 1. Therefore, the despreader 310 of FIG. 3 is substantially identical in operation to the N despreaders of the first despreader 141 to the $N^{th}$ despreader 143 in the first finger 140-1.

The reception beam weight step calculator 331 in the signal processor 330 initially receives an initial reception beam weight step $\mu_0$ having a constant gain, calculates a reception beam weight step $\mu$ in a method described in connection with Equation (16), and outputs the calculated reception beam weight step $\mu$ to the reception beam weight calculator 333. The reception beam weight calculator 333 calculates a reception beam weight $\underline{w}_k$ by receiving the despread reception signal $\underline{y}_k$, a finger output signal $\underline{z}_k$ output from the reception beam generator 320, the reception beam weight step $\mu$ output from the reception beam weight step calculator 331, and an initial reception beam weight $\underline{w}_0$, and outputs the calculated reception beam weight $\underline{w}_k$ to the memory 335. The memory 335 buffers the reception beam weight $\underline{w}_k$ calculated by the reception beam weight calculator 333, and the reception beam weight calculator 333 uses the reception beam weight $\underline{w}_k$ stored in the memory 335 when updating the reception beam weight $\underline{w}_k$. That is, the reception beam weight calculator 333 updates a reception beam weight $\underline{w}_{k+1}$ at the next point k+1 using the reception beam weight $\underline{w}_k$ calculated at the point k.

Figure 4:
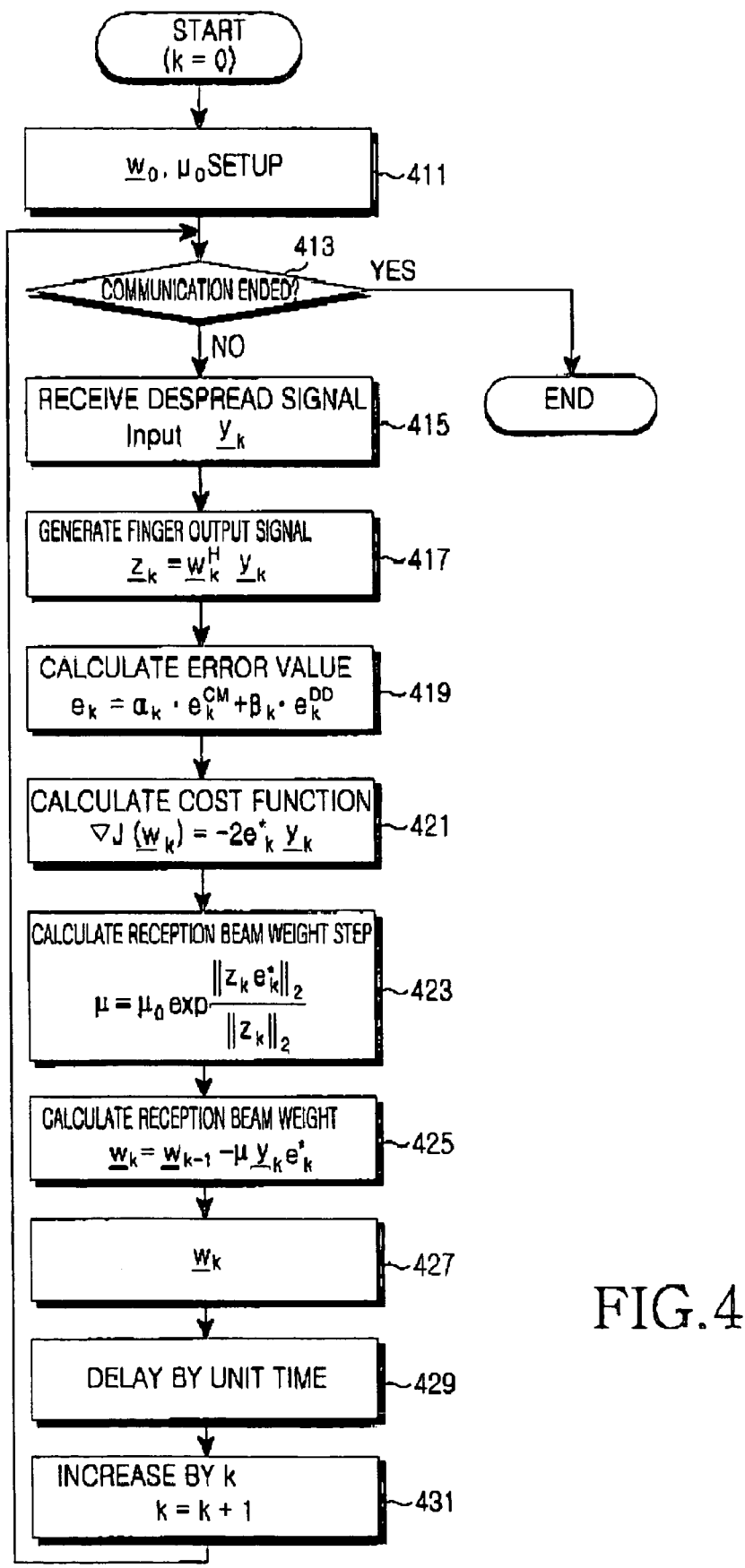
FIG. 4 is a flowchart illustrating a signal reception procedure by a base station receiver according to an embodiment of the present invention.

FIG. 4 is a flowchart illustrating a signal reception procedure by a base station receiver according to an embodiment of the present invention. Referring to FIG. 4, in step 411, a base station receiver sets up an initial reception beam weight $\underline{w}_0$ and an initial reception beam weight step $\mu_0$ having a constant gain. In step 413, the base station receiver determines if communication is ended. If it is determined that the communication is ended, the base station receiver ends the ongoing procedure. If it is determined in step 413 that the communication is not ended, the base station receiver proceeds to step 415.

In step 415, the base station receiver receives a despread signal $\underline{y}_k$ for the reception signal $\underline{x}_k$. In step 417, the base station receiver calculates a set $\underline{z}_k$ of signals $\underline{z}_k$ output from respective fingers of the base station receiver using the despread signal $\underline{y}_k$ and a reception beam weight $$\underline{w}_k (z_k = \underline{w}_k^H \underline{y}_k).$$

$\underline{z}_k$ represents a set of finger output signals generated using a reception beam generated using the reception beam weight $\underline{w}_k$.

In step 419, the base station receiver calculates an error value $\underline{e}_k$ for reducing an error between the reception signal $\underline{x}_k$ and the desired reception signal $d_k$ ($e_k = \alpha_k \cdot e_k^{CM} + \beta_k \cdot e_k^{DD}$), and in step 421, the base station receiver calculates a differentiated value of a cost function using the despread signal $\underline{y}_k$ and the error value $\underline{e}_k$ ($\nabla J(\underline{w}_k) = -2e^* k^x_k$).

In step 423, the base station receiver calculates a reception beam weight $$\left( \mu = \mu_0 \exp\left( \frac{\|z_k e_k^*\|_2}{\|z_k\|_2} \right) \right).$$

In step 425, the base station receiver calculates a beam generation coefficient, or a reception beam weight ($\underline{w}_k = \underline{w}_k - \mu \underline{y}_k e^*_k^-$). In step 427, the base station receiver maintains the calculated reception beam weight $\underline{w}_k$.

In step 429, the base station receiver delays by a predetermined unit time. The reason for delaying by the predetermined unit time is to consider a state transition delay time. In step 431, the base station receiver increases the k by 1, i.e. transitions from the current point k to the next point k+1, and then returns to step 413.

Figure 7:
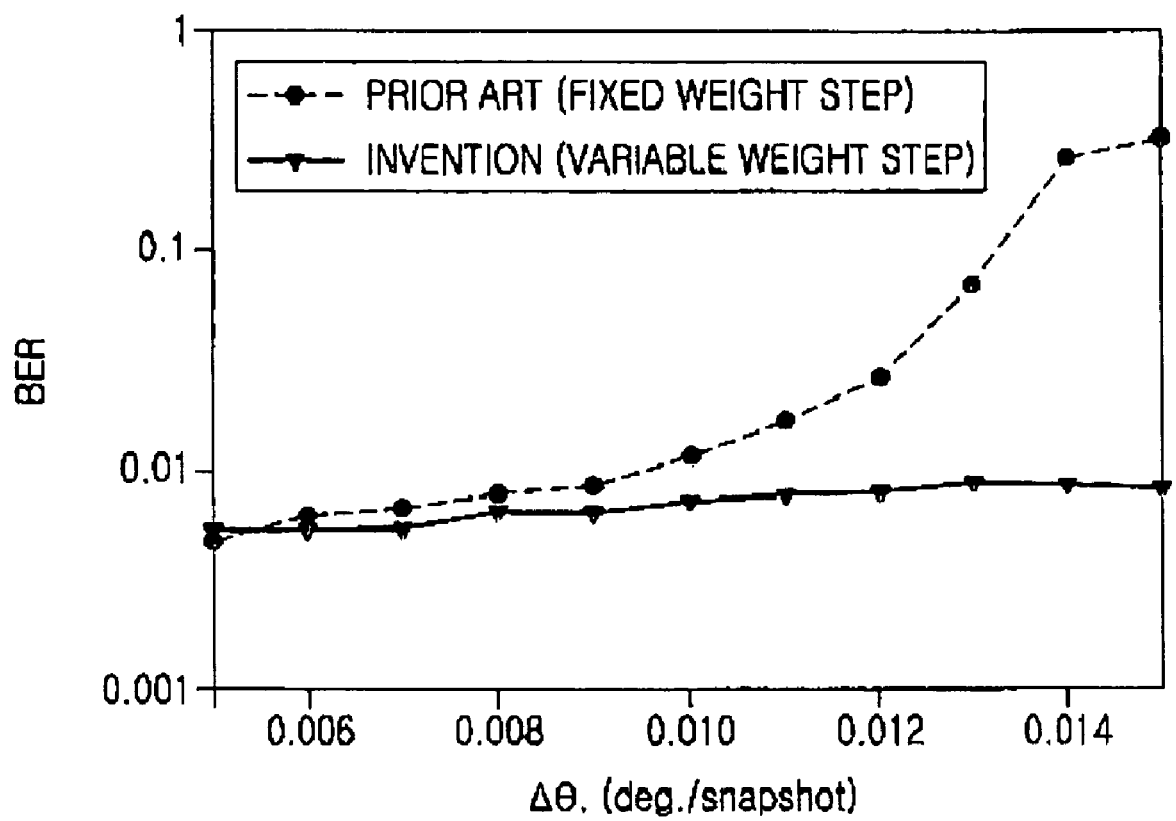
FIG. 7 is a graph illustrating a simulation result on a general reception beam weight generation technique and a reception beam weight generation technique according to an embodiment of the present invention.

FIG. 7 is a graph illustrating a simulation result on a general reception beam weight generation technique and a reception beam weight generation technique according to an embodiment of the present invention. The simulation result illustrated in FIG. 7 was obtained for a Rayleigh channel with a signal to noise ratio (SNR) of 6[dB]. Referring to FIG. 7, it is noted that the reception beam weight generation technique using the adaptive reception beam weight step $\mu$, or a variable reception beam weight step $\mu$, proposed in the present invention is superior in bit error rate (BER) performance for a moving angle $\Delta\theta$ of a mobile station based on one snapshot. In the conventional reception beam weight generation technique, an increase in moving angle $\Delta\theta$ of a mobile station degrades BER performance.

Figure 8:
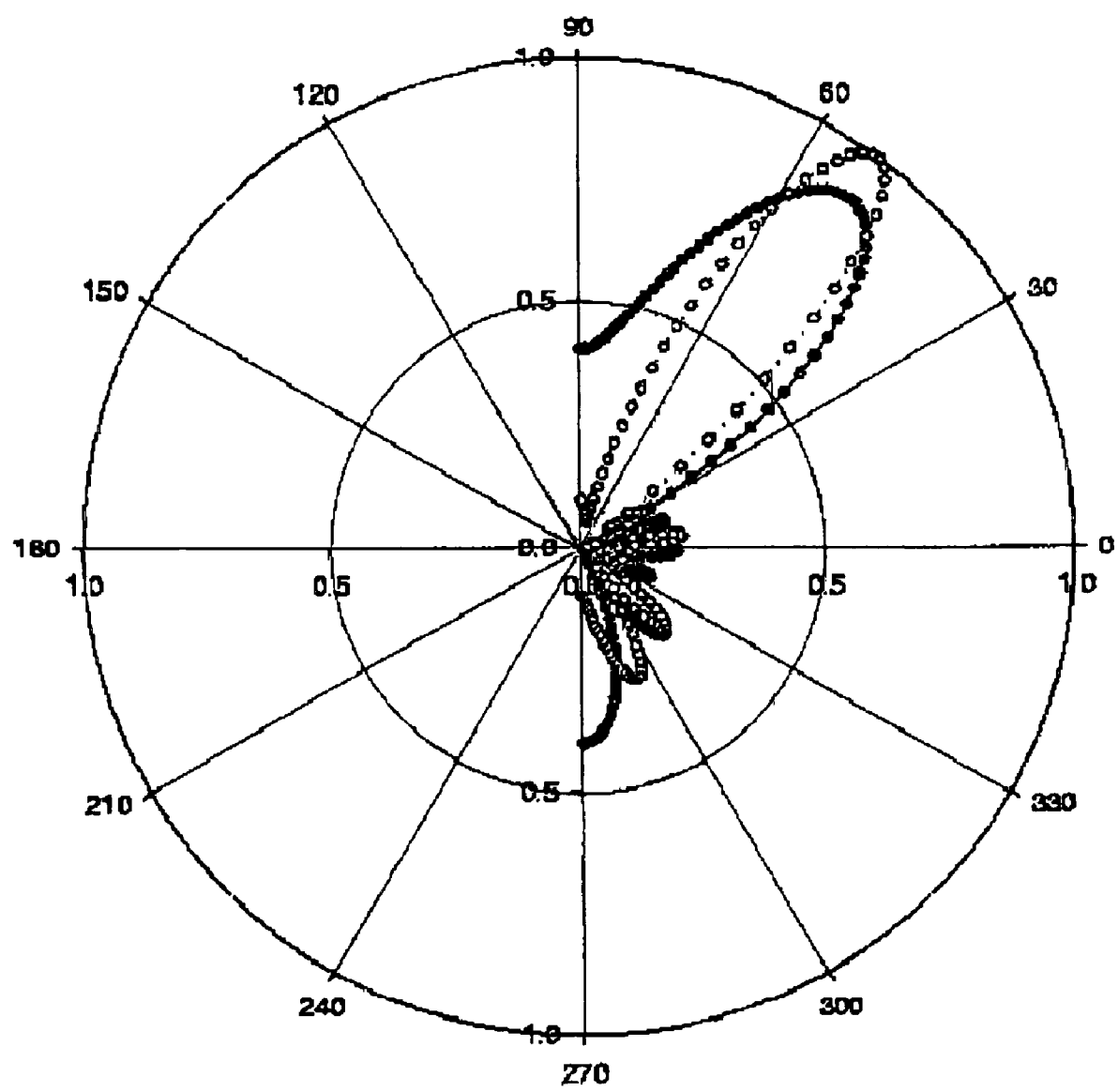
FIG. 8 is a graph illustrating a characteristic curve according to the number of reception antennas of a base station receiver for an adaptive reception beam weight generation technique according to an embodiment of the present invention.

FIG. 8 is a graph illustrating a characteristic curve according to the number of reception antennas of a base station receiver for an adaptive reception beam weight generation technique according to an embodiment of the present invention. Referring to FIG. 8, there is illustrated a radiation pattern for a base station receiver having 6 reception antennas and a base station receiver having 10 reception antennas. For example, if it is assumed that a particular base station is located at 57°, it is noted that compared with the base station receiver having 6 reception antennas, the base station receiver having 10 reception antennas has a normalized antenna gain of about 0.2 dB, and can more correctly generate a reception beam. Therefore, in terms of capacity of an OFDM mobile communication system, an increase in the number of the reception antennas causes an increase in the amplitude of the reception signals enabling correct communication, thereby contributing to an increase in system capacity.

Figure 9:
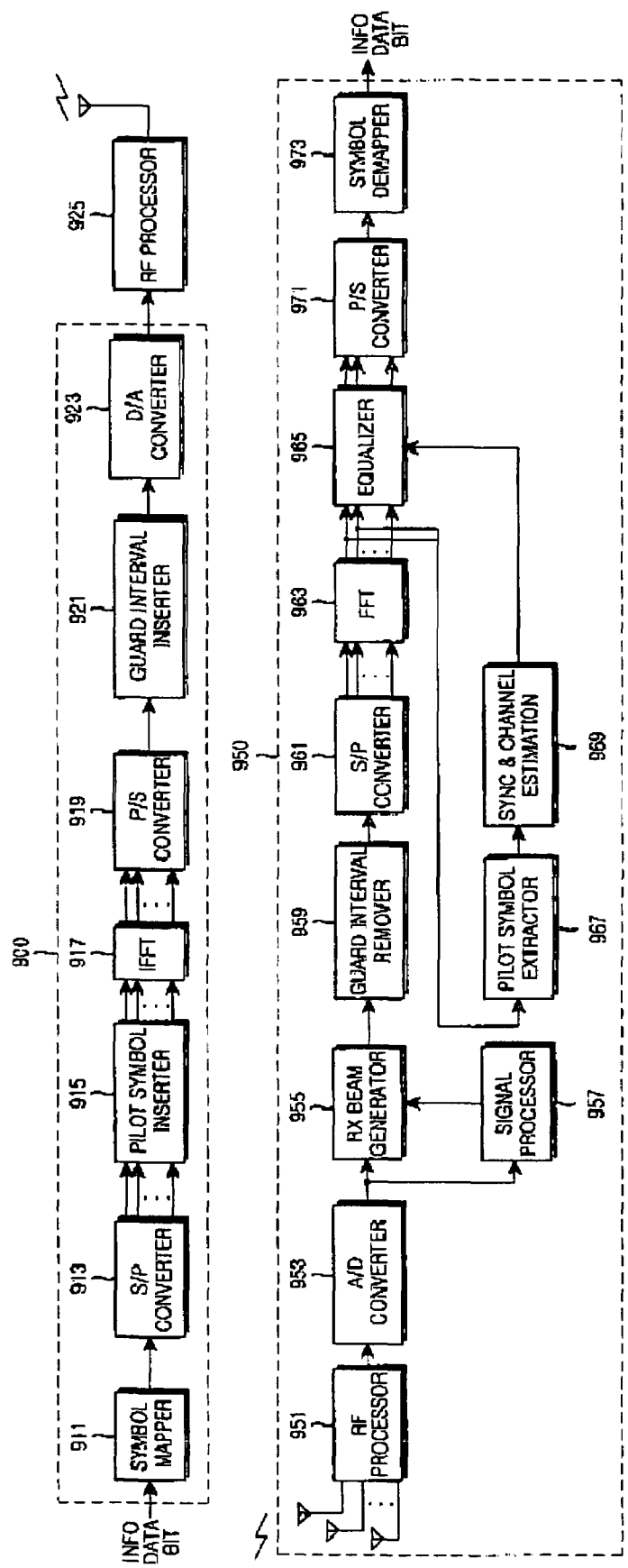
FIG. 9 is a block diagram illustrating a structure of an OFDM mobile communication system according to an embodiment of the present invention.

FIG. 9 is a block diagram illustrating a structure of an OFDM mobile communication system according to an embodiment of the present invention. Referring to FIG. 9, the OFDM communication system includes a mobile station transmitter 900 and a base station receiver 950. The mobile station transmitter 900 includes a symbol mapper 911, a serial-to-parallel (S/P) converter 913, a pilot symbol inserter 915, an inverse fast Fourier transform (IFFT) block 917, a parallel-to-serial (P/S) converter 919, a guard interval inserter 921, a digital-to-analog (D/A) converter 923, and a radio frequency (RF) processor 925.

When there are information data bits to be transmitted, the information data bits are input to the symbol mapper 911. The symbol mapper 911 modulates the input information data bits in a predetermined modulation scheme for symbol mapping, and outputs the symbol-mapped data bits to the serial-to-parallel converter 913. Here, quadrature phase shift keying (QPSK) or 16-ary quadrature amplitude modulation (16QAM) can be used as the modulation scheme. The serial-to-parallel converter 913 parallel-converts serial modulation symbols output from the symbol mapper 911, and outputs the parallel-converted modulation symbols to the pilot symbol inserter 915. The pilot symbol inserter 915 inserts pilot symbols in the parallel-converted modulation symbols output from the serial-to-parallel converter 913, and then outputs the pilot symbol-inserted modulation symbols to the IFFT block 917.

The IFFT block 917 performs N-point IFFT on the signals output from the pilot symbol inserter 915, and outputs the resultant signals to the parallel-to-serial converter 919. The parallel-to-serial converter 919 serial-converts the signals output form the IFFT block 917, and outputs the serial-converted signals to the guard interval inserter 921. The guard interval inserter 921 receives the signal output from the parallel-to-serial converter 919, inserts a guard interval therein, and outputs the guard interval-inserted signal to the digital-to-analog converter 923. The guard interval is inserted to remove interference between a previous OFDM symbol transmitted at a previous OFDM symbol time and a current OFDM symbol to be transmitted at a current OFDM symbol time in an OFDM communication system. For the guard interval, a cyclic prefix method or a cyclic postfix method is used. In the cyclic prefix method, a predetermined number of last samples of an OFDM symbol in a time domain are copied and inserted into a valid OFDM symbol. In the cyclic postfix method, a predetermined number of first samples of an OFDM symbol in a time domain are copied and inserted into a valid OFDM symbol.

The digital-to-analog converter 923 analog-converts the signal output from the guard interval inserter 921, and outputs the analog-converted signal to the RF processor 925. The RF processor 925, which includes a filter and a front-end unit, RF-processes the signal output from the digital-to-analog converter 923 such that the signal can be transmitted via a transmission antenna.

The base station receiver 950 includes an RF processor 951, an analog-to-digital (A/D) converter 953, a reception beam generator 955, a signal processor 957, a guard interval remover 959, a serial-to-parallel (S/P) converter 961, a fast Fourier transform (FFT) block 963, an equalizer 965, a pilot symbol extractor 967, a synchronization & channel estimation unit 969, a parallel-to-serial (P/S) converter 971, and a symbol demapper 973.

The signals transmitted by the mobile station transmitter 900 are received via reception antennas of the base station receiver 950, the received signals experiencing a multipath channel and having a noise component. The signals received via the reception antennas are input to the RF processor 951, and the RF processor 951 down-converts the signals into an intermediate frequency (IF) signal, and outputs the IF signal to the analog-to-digital converter 953. The analog-to-digital converter 953 digital-converts an analog signal output from the RF processor 951, and outputs the digital-converted signal to the reception beam generator 955 and the signal processor 957. Operations of the reception beam generator 955 and the signal processor 957 have been described, so a detailed description thereof will be omitted.

The signal output from the reception beam generator 955 is input to the guard interval remover 959. The guard interval remover 959 removes a guard interval from the signal output from the reception beam generator 955, and outputs the resultant signal to the serial-to-parallel converter 961. The serial-to-parallel converter 961 parallel-converts the serial signal output from the guard interval remover 959, and outputs the resultant signal to the FFT block 963. The FFT block 963 performs N-point FFT on the signal output from the serial-to-parallel converter 961, and outputs the resultant signal to the equalizer 965 and the pilot symbol extractor 967. The equalizer 965 performs channel equalization on the signal output from the FFT block 963, and outputs a resultant signal to the parallel-to-serial converter 971. The parallel-to-serial converter 971 serial-converts the parallel signal output from the equalizer 965, and outputs a resultant signal to the symbol demapper 973. The symbol demapper 973 demodulates the signal output from the parallel-to-serial converter 971 using a demodulation scheme corresponding to the modulation scheme used in the mobile station transmitter 900, and outputs a resultant signal as received information data bits.

Further, the signal output from the FFT block 963 is input to the pilot symbol extractor 967, and the pilot symbol extractor 967 extracts pilot symbols from the signal output from the FFT block 963, and outputs the extracted pilot symbols to the synchronization & channel estimation unit 969. The synchronization & channel estimation unit 969 synchronizes and channel estimates the pilot symbols output from the pilot symbol extractor 967, and outputs the result to the equalizer 965.

As is understood from the foregoing description, the mobile communication system generates a reception beam weight using an adaptive reception beam weight generation technique, i.e., an appropriate combination of the CM technique and the DD technique, thereby making it possible to rapidly generate a reception beam weight with a minimum MSE value. Therefore, it is possible to generate a correct reception beam, and the correct reception of a reception beam enables a receiver to correctly receive only a desired signal, thereby improving system performance. In addition, the present invention increases a convergence rate by adaptively generating a reception beam weight step according to a channel variation rate, thereby minimizing a time to arrive at the minimum MSE and improving system performance.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. An apparatus for receiving a signal in a base station including at least one reception antenna, the apparatus comprising:

a despreader for receiving a reception signal and despreading the reception signal;

a signal processor for receiving the despread signal, calculating an error value representative of a difference between the reception signal and a desired reception signal using a combined technique of a first technique and a second technique, calculating a reception beam weight step value using the error value and an output signal generated by applying a previous reception beam weight to the despread signal, and calculating a difference between the previous reception beam weight and a product of the reception beam weight step value, the despread signal, and a conjugate value of the error value, as a current reception beam weight; and a reception beam generator for generating the reception beam using the despread signal and the reception beam weight, and generating the output signal by applying the reception beam to the despread signal.

2. The apparatus of claim 1, wherein the signal processor comprises:
a weight calculator for calculating the error value using the combined technique of the first technique and the second technique by receiving the despread signal, and calculating a difference between the previous reception beam weight and a product of the reception beam weight step value, the despread signal, and a conjugate value of the error value, as the weight; and
a reception beam weight step calculator for calculating the reception beam weight step value using the error value and the output signal.

3. The apparatus of claim 1, wherein the error value is a Mean Square Error (MSE) value.

4. The apparatus of claim 1, wherein the first technique is a Constant Modulus (CM) technique and the second technique is a Decision-Directed (DD) technique.

5. The apparatus of claim 1, wherein the signal processor determines the reception beam weight step value such that the reception beam weight becomes an optimal reception beam in a direction of the reception signal.

6. A method for receiving a signal in a base station including at least one reception antenna, the method comprising the steps of:
receiving a reception signal and despreading the reception signal;
calculating an error value representative of a difference between the reception signal and a desired reception signal using a combined technique of a first technique and a second technique by receiving the despread signal;
calculating a reception beam weight step value using the error value and an output signal generated by applying a previous reception beam weight to the despread signal;
calculating a difference between the previous reception beam weight and a product of the reception beam weight step value, the despread signal, and a conjugate value of the error value, as a current reception beam weight;
generating the reception beam using the despread signal and the reception beam eight; and
generating the output signal by applying the reception beam to the despread signal.

7. The method of claim 6, wherein the error value is a Mean Square Error (MSE) value.

8. The method of claim 6, wherein the first technique is a Constant Modulus (CM) technique and the second technique is a Decision-Directed (DD) technique.

9. The method of claim 6, wherein the step of determining the reception beam weight step value comprises the step of determining the reception beam weight step value such that the reception beam weight becomes an optimal reception beam in a direction of the reception signal.

10. A method for receiving a signal in a base station including at least one reception antenna, the method comprising the steps of:
calculating an error value representative of a difference between a reception signal and a desired reception signal using a combined technique of a first technique and a second technique by receiving the reception signal;
calculating a reception beam weight step value using the error value and an output signal generated by applying a previous reception beam weight to the reception signal;
calculating a difference between the previous reception beam weight and a product of the reception beam weight step value, the reception signal and a conjugate value of the error value, as a current reception beam weight;
generating the reception beam using the reception signal and the reception beam weight; and
generating the output signal by applying the reception beam to the reception signal.

11. The method of claim 10, wherein the error value is a Mean Square Error (MSE) value.

12. The method of claim 10, wherein the first technique is a Constant Modulus (CM) technique and the second technique is a Decision-Directed (DD) technique.

13. The method of claim 10, wherein the step of determining the reception beam weight step value comprises the step of determining the reception beam weight step value such that the reception beam weight becomes an optimal reception beam in a direction of the reception signal.

14. A method for generating an optimal reception beam weight such that a reception beam becomes an optimal reception beam in a direction of a reception signal, in a base station including at least one reception antenna, the base station generating a reception beam of the reception antenna using a previous reception beam weight and a despread signal of a current reception signal, calculating an error value indicating a difference between the current reception signal and a desired reception signal, and calculating a current reception beam weight using the previous reception beam weight, the despread signal, and the error value, the method comprising the steps of:
generating a reception beam weight step value using the error value and an output signal generated by applying the reception beam weight to the despread signal;
calculating a difference between the previous reception beam weight and a product of the reception beam weight step value, the despread signal, and a conjugate value of the error value, as the current reception beam weight; and
selecting the reception beam weight step value such that the current reception beam weight becomes the optimal reception beam.

15. An apparatus for generating an optimal reception beam weight such that a reception beam becomes an optimal reception beam in a direction of a reception signal, in a base station including at least one reception antenna, the base station generating a reception beam of the reception antenna using a previous reception beam weight and a despread signal of a current reception signal, calculating an error value indicating a difference between the current reception signal and a desired reception signal, and calculating a current reception beam weight using the previous reception beam weight, the despread signal, and the error value, the apparatus comprising:
a reception beam weight step calculator for calculating a reception beam weight step value using the error value and an output signal generated by applying the reception beam weight to the despread signal; and
a reception beam weight calculator for calculating a difference between the previous reception beam weight and a product of the reception beam weight step value, the despread signal, and a conjugate value of the error value, as the current reception beam weight.

16. The apparatus of claim 15, wherein the reception beam weight step calculator selects the reception beam weight step value such that the current reception beam weight becomes the optimal reception beam.

17. A method for generating an optimal reception beam weight such that a reception beam becomes an optimal reception beam in a direction of a reception signal, in a base station including at least one reception antenna, the base station generating a reception beam of the reception antenna using a previous reception beam weight and a current reception signal, calculating an error value indicating a difference between the current reception signal and a desired reception signal, and calculating a current reception beam weight using the previous reception beam weight, the current reception signal, and the error value, the method comprising the steps of:

generating a reception beam weight step value using the error value and an output signal generated by applying the reception beam weight to the reception signal;

calculating a difference between the previous reception beam weight and a product of the reception beam weight step value, the reception signal, and a conjugate value of the error value, as the current reception beam weight; and selecting the reception beam weight step value such that the current reception beam weight becomes the optimal reception beam.

18. An apparatus for generating an optimal reception beam weight such that a reception beam becomes an optimal reception beam in a direction of a reception signal, in a base station including at least one reception antenna, the base station generating a reception beam of the reception antenna using a previous reception beam weight and a current reception signal, calculating an error value indicating a difference between the current reception signal and a desired reception signal, and calculating a current reception beam weight using the previous reception beam weight, the current reception signal, and the error value, the apparatus comprising:

a reception beam weight step calculator for calculating a reception beam weight step value using the error value and an output signal generated by applying the reception beam weight to the reception signal; and a reception beam weight calculator for calculating a difference between the previous reception beam weight and a product of the reception beam weight step value, the reception signal, and a conjugate value of the error value, as the current reception beam weight.

19. The apparatus of claim 18, wherein the reception beam weight step calculator selects the reception beam weight step value such that the current reception beam weight becomes the optimal reception beam.

20. An apparatus for receiving a signal in a base station including at least one reception antenna, the apparatus comprising:

a signal processor for calculating an error value representative of a difference between the reception signal and a desired reception signal using a combined technique of a first technique and a second technique by receiving the reception signal, calculating a reception beam weight step value using the error value and an output signal generated by applying a previous reception beam weight to the reception signal, and calculating a difference between the previous reception beam weight and a product of the reception beam weight step value, the reception signal, and a conjugate value of the error value, as a current reception beam weight; and a reception beam generator for generating the reception beam using the reception signal and the reception beam weight, and generating the output signal by applying the reception beam to the reception signal.

21. The apparatus of claim 20, wherein the error value is a Mean Square Error (MSE) value.

22. The apparatus of claim 20, wherein the first technique is a Constant Modulus (CM) technique and the second technique is a Decision-Directed (DD) technique.

23. The apparatus of claim 20, wherein the signal processor determines the reception beam weight step value such that the reception beam weight becomes an optimal reception beam in a direction of the reception signal.

* * * * *